(12) United States Patent
Mason et al.

(10) Patent No.: US 7,437,141 B2
(45) Date of Patent: *Oct. 14, 2008

(54) APPARATUS AND METHOD FOR EASILY RESTORING A CONNECTION TO A TELEPHONE

(75) Inventors: Andrew Mason, Sunnyvale, CA (US); Zeno Staemmer, Thalwil (CH)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/010,787

(22) Filed: Dec. 13, 2004

(65) Prior Publication Data

US 2006/0128388 A1    Jun. 15, 2006

(51) Int. Cl.
*H04Q 7/20* (2006.01)

(52) U.S. Cl. ............ 455/403; 455/423; 455/415; 455/426.1; 455/445; 455/461; 379/120; 379/88.2; 370/260; 709/205

(58) Field of Classification Search ......... 455/415–416, 455/414.1, 403, 405–406, 445, 422.1, 423, 455/426.1–426.2, 461–462, 544.1–55, 567; 379/88.01, 211.01–211.03, 114.29, 15.02, 379/120; 370/260, 400–403, 338, 352; 709/204–205
See application file for complete search history.

(56) References Cited

U.S. PATENT DOCUMENTS

| | | | |
|---|---|---|---|
| 5,995,830 A * | 11/1999 | Amin et al. | 455/423 |
| 6,608,820 B1 * | 8/2003 | Bradshaw, Jr. | 455/416 |
| 6,993,355 B1 * | 1/2006 | Pershan | 455/518 |
| 7,035,385 B2 * | 4/2006 | Levine et al. | 455/413 |
| 7,085,809 B2 * | 8/2006 | Mori et al. | 709/203 |
| 2001/0056473 A1 * | 12/2001 | Arneson et al. | 709/217 |
| 2002/0129282 A1 * | 9/2002 | Hopkins | 713/201 |
| 2004/0235509 A1 * | 11/2004 | Burritt et al. | 455/519 |
| 2005/0002501 A1 * | 1/2005 | Elsey et al. | 379/88.17 |
| 2005/0058088 A1 * | 3/2005 | Decker et al. | 370/260 |
| 2005/0202849 A1 * | 9/2005 | Ignatin | 455/564 |
| 2006/0149815 A1 * | 7/2006 | Spradling et al. | 709/205 |
| 2006/0177034 A1 * | 8/2006 | Reding et al. | 379/211.02 |
| 2007/0223509 A1 * | 9/2007 | Chatterjee et al. | 370/432 |
| 2007/0232284 A1 * | 10/2007 | Mason et al. | 455/416 |

* cited by examiner

*Primary Examiner*—Kamran Afshar

(57) ABSTRACT

A method, system, and article of manufacture for restoring a telephone connection between a first communication device and at least one other communication device. In some embodiments, the method includes establishing a first telephone call between a first communication device associated with a telecommunication system and at least one other communication device, initiating a call to the telecommunication system from the first communication device using a predetermined number, and automatically initiating, in response to the call to the predetermined number, a reconnect call by the telecommunication system to establish a second call between the first communication device and the at least one other communication device. In some embodiments, the first call and the second call may be between a first communication device and at least two other communication devices.

25 Claims, 4 Drawing Sheets

APPARATUS AND METHOD FOR EASILY RESTORING A CONNECTION TO A TELEPHONE

BACKGROUND

The advent and continued development of telecommunication systems, including telecommunication systems that integrate voice, video, web services, and wireless communication systems, has led to an increased use and dependence thereon. Whether the dependence is a matter of necessity for business and/or emergency service applications or a matter of convenience for personal contexts of use, there is a need to quickly and easily re-establish a communication link in the instance the communication link is interrupted. Interruptions to a communication link may occur for a number of reasons, such as, for example, a loss of a cellular telephone call signal between two or more communication devices using a cellular communication network.

One area of communication system design and applications in which improvement would be especially desirable relates to the reconnection of two or more communication devices that were previously communicating with each other. Accordingly, there exists a need to provide methods and apparatus for efficiently reconnecting two or more communication devices previously connected and communicating with each other, particularly in the instance the communication between the two or more devices is unexpectedly or undesirably interrupted.

SUMMARY

Apparatus and methods are therefore presented for improved management and reconnection of telephone calls.

According to some embodiments, a method of reconnecting a telephone call is provided herein. The method may include establishing a first telephone call between a first communication device associated with a telecommunication system and at least one other communication device. The first call may be unexpectedly or otherwise undesirably interrupted. In some instances, the call may end and one or more of the participants in the telephone call (i.e., user or caller), may want to reconnect with other participants of the terminated call. The method may allow for a telephone call to be initiated to the telecommunication system from the first communication device using a predetermined number. In response to the call to the predetermined number, the telecommunication system may initiate a reconnect call to establish a second call between the first communication device and the at least one other communication device.

According to some embodiments, the first telephone call and the second telephone call may involve more than two communication devices, and the first communication device, at least, may be a wireless communication device (e.g., a cellular telephone).

According to some embodiments, ANI (Automatic Number Identification) information of the first communication device that initiated the call to the telecommunication system using the predetermined number is extracted and used to identify a caller associated with the ANI information. The telecommunication system may use the knowledge of the identified caller and an awareness of a call history of the first communication device to reconnect the first communication device to the at least one other communication device.

BRIEF DESCRIPTION OF THE DRAWINGS

Further aspects of the instant methods and apparatus will be more readily appreciated upon review of the detailed description included below, in conjunction with the accompanying drawings, of which.

DETAILED DESCRIPTION

Figure 1:
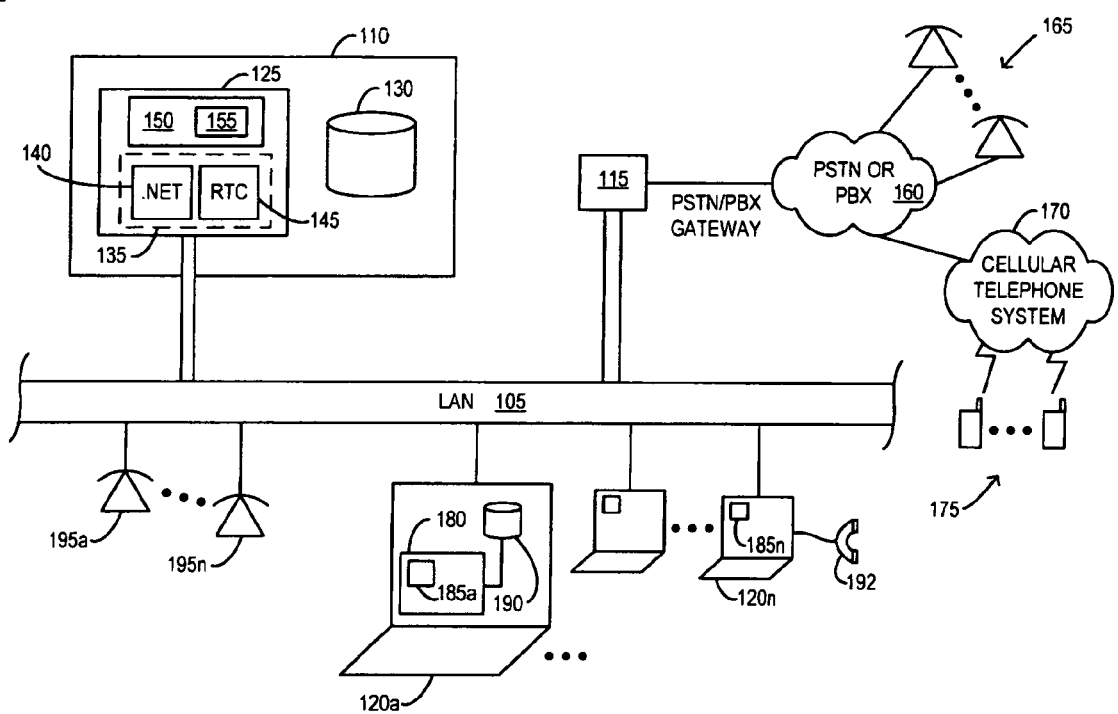
FIG. 1 is an exemplary diagram of a telecommunication system, according to some embodiments of the present invention.

Referring to FIG. 1, a diagram of an exemplary telecommunications system according to some embodiments herein is shown, generally represented by reference number 100. Telecommunication system 100 may comprise one or more systems for transferring data, including a local area network, a wide area network, a telephone network, a cellular network, a fiber-optic network, a satellite network, an infra-red network, a radio frequency network, and any other type of network which may be used to transmit information between devices. Additionally, data may be transmitted through telecommunication system 100 using one or more currently- or hereafter-known network protocols, including but not limited to Asynchronous Transfer Mode (ATM), Internet Protocol (IP), Hypertext Transfer Protocol (HTTP) and Wireless Application Protocol (WAP).

Telecommunication system 100 includes a local area network (LAN) 105. LAN 105 may be implemented using a TCP/IP network and may implement voice or multimedia over IP using, for example, the Session Initiation Protocol (SIP). Operably coupled to the LAN 105 is a server 110, a number of telephones 195a-195n, a number of computers 120a-120n, and a gateway 115.

Although one server 110 is shown connected to LAN 105, two or more servers may be operably connected to LAN 105 to accomplish functions similar to, different than, or in addition to the functions provided by server 110.

Server 110 may include a live communication server (LCS; not separately shown) to operate with LCS software available from Microsoft®, a server (not separately shown; possibly including a co-processor) to run OpenScape®, a communications software suite developed by Siemens AG®, a media server (not separately shown) that performs functions such as voice mail, speech recognition, etc., and a multipoint control unit (MCU). En some embodiments, one or more of these functions may be performed on one or more of server(s) 110. One or more of these servers or another server (not separately shown) coupled to LAN 105 may perform presence monitoring with respect to users of telecommunication system 100.

Server 105 may include one or more controllers 125, which may be embodied as one or more microprocessors, and a memory 130 for storing application programs and data. Controller 125 may implement an instant messaging system 135. Instant messaging system 135 may be embodied as Microsoft Windows® Messenger™ or other instant messaging systems. Thus, according to some embodiments hereof, instant messaging system 135 may implement a Microsoft.Net environment 140 and Real Time Communications protocol (RTC) 145.

According to some embodiments hereof, a collaboration system 155 may be provided, which may be part of an interactive suite of telecommunication applications 150, run by controller 125, as will be described in greater detail below.

Gateway 115 may be implemented as a gateway to a private branch exchange (PBX), public switched telephone network (PSTN) 160, or any of a variety of other networks, such as a wireless or a cellular network. Land-line telephones 165 are shown connected to PSTN/PBX 160, as are one or more cellular telephone systems 170 that support cellular telephones 175. One or more LAN telephones 190a-190n may be operably coupled to LAN 105.

Computers 120a-120n may be personal computers, operating the Windows® XP operating system and thus, Windows® Messenger™. Computers 120a-120n may include telephone and other multimedia messaging capability using, for example, a peripheral camera, a microphone, speakers (not shown), or peripheral telephone handsets 190, such as an Optipoint or Gigaset handset, available from Siemens AG®. In some embodiments, one or more of computers 120a-120n may be implemented as a wireless telephone, a digital telephone, a personal digital assistant (PDA), or other communication device.

As illustrated, computers 120a-120n may be implemented using one or more processors 180a-180n, such as a Pentium® or other type of microprocessor, and storage 190 connected to processor for executing and storing, for example, applications, operating systems, and other programs.

Computers 120a-120n may implement an Interaction Service 185a-185n, according to some embodiments hereof. Interaction Services 185a-185n provide functionality for interworking of a phone, a buddy list, instant messaging, presence, collaboration, calendar and other applications.

Figure 2:
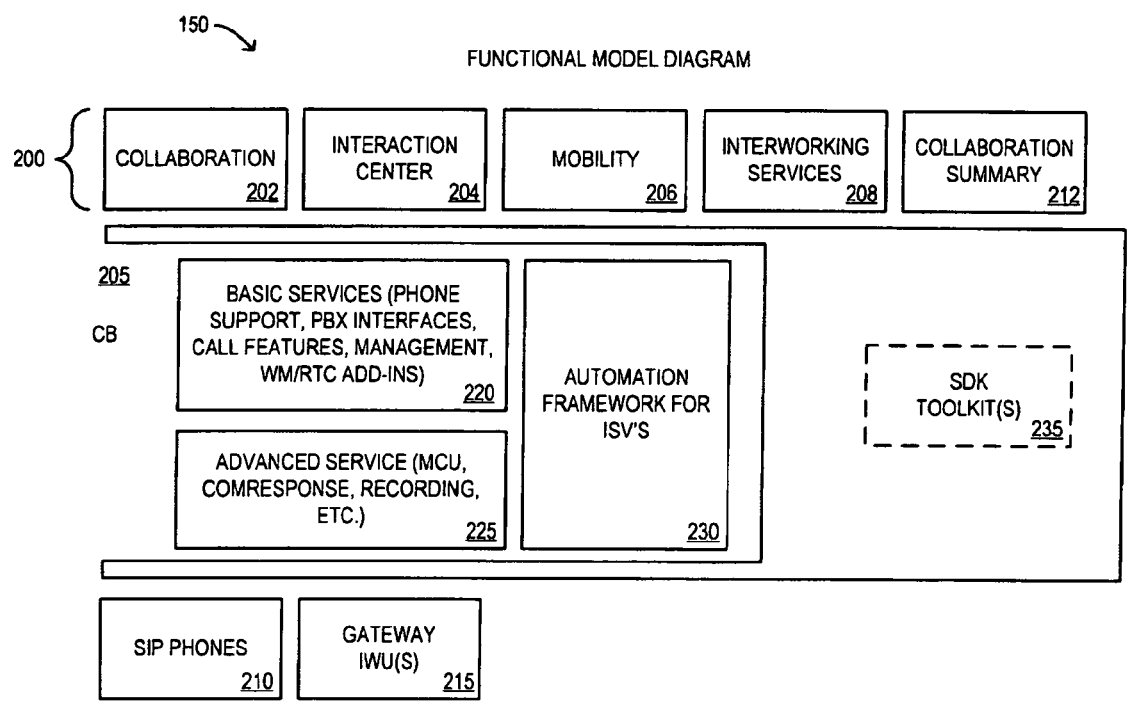
FIG. 2 is an exemplary diagram illustrating aspects of a telecommunication server, according to some embodiments hereof.

Referring to FIG. 2, a functional block diagram illustrating telecommunication application 155 is shown. FIG. 2 provides a logical diagram illustrating a particular embodiment of server 110. Server 110 includes a plurality of application modules 200 and a communication broker (CB) module 205. One or more of application modules 200 and communication broker module 205 may include an inference engine, i.e., a rules-based artificial intelligence engine for implementing various functions of the collaboration server. Server 110 may provide interfaces, such as APIs (application programming interfaces) to SIP phones 210 and gateways/interworking units 215.

According to some embodiments, broker module 205 includes a basic services module 220, an advanced services module 225, an automation module 230, and a toolkit module 235.

Basic services module 220 functions to implement, for example, phone support, PBX interfaces, call features and management, as well as Windows® Messaging and RTC add-ins, when necessary. The phone support features allow maintenance of and access to buddy lists and provide presence status.

Advanced services module 225 implements functions such as presence, multipoint control unit (MCU), recording, and the like. MCU functions are used for voice conferencing and support ad hoc and dynamic conference creation from a buddy list following the SIP conferencing model for ad hoc conferences. Telephone conference call set-up and management functions include capabilities for re-connecting dropped cellular telephones to conference telephone calls, as described in more detail below.

In certain embodiments, support for G.711 and G.723.1 codecs is provided. Further, in certain embodiments, the MCU can distribute media processing over multiple servers using the MEGACO protocol.

Presence features of advanced features module 225 provide device context for both SIP registered devices and user-defined non-SIP devices. Various user contexts, such as In Meeting, On Vacation, In the Office, etc., can be provided for. In addition, voice, e-mail and instant messaging availability may be provided across a user's communication device(s). The presence feature enables real time call control using presence information, e.g., to choose a destination of a communication (e.g., a call or message) based on the presence of a user's communication device(s) associated with telecommunication system 100, including server 110.

In addition, it should be understood that various components have a central repository for presence information and for changing and querying presence information. In addition, the presence module provides a user interface for presenting the user with presence information.

In addition, broker module 205 may include a ComResponse platform available from Siemens Information and Communication Networks, Inc. ComResponse features include speech recognition, speech-to-text, and text-to-speech, and allow for creation of scripts for applications.

Real time call control may be provided by a SIP API 210 associated with basic services module 220. That is, calls can be intercepted in progress and real time actions performed on them, including directing those calls to alternate destinations based on rules and/or other stimuli. SIP API 210 also provides call progress monitoring capabilities and provides for reporting status of such calls to interested applications. SIP API 210 also provides for call control from an user interface.

According to the embodiment illustrated, the application modules may include a collaboration module 202, an interaction center module 204, a mobility module 206, and interworking services module 208, and a collaboration summarization module 212.

Collaboration module 202 allows for creation, modification or deletion of a collaboration session for a group of users. Collaboration module 202 may further allow for invoking a voice conference from any client. In addition, collaboration module 202 may launch a multi-media conferencing package, such as the WebEx® package. It should be appreciated by those in the art that the multi-media conferencing functionality may be handled by other products.

Interaction center 204 provides a telephony interface for both subscribers and guests. Subscriber access functions include calendar access and voicemail and e-mail access. The calendar access allows the subscriber to accept, decline, or modify appointments, as well as block out particular times. The voicemail and e-mail access allows the subscriber to access and sort messages.

Similarly, the guest access feature allows the guest access to voicemail for leaving messages and calendar functions for scheduling, canceling, and modifying appointments with subscribers. Further, the guest access feature allows a guest user to access specific data meant for them, e.g., receiving e-mail and fax back, etc.

Mobility module 206 provides for message forwarding and "one number" access across media, and message "morphing" across media for the subscriber. Various applications can send notification messages to a variety of destinations, such as e-mails, instant messages, pagers, and the like. In addition, the subscriber can set rules that mobility module 206 uses to define media handling, such as e-mail, voice and instant messaging handling. Such rules specify data and associated actions. For example, a rule may be defined to state, "If I'm traveling and receive a voicemail or e-mail marked Urgent, then page me."

Figure 3:
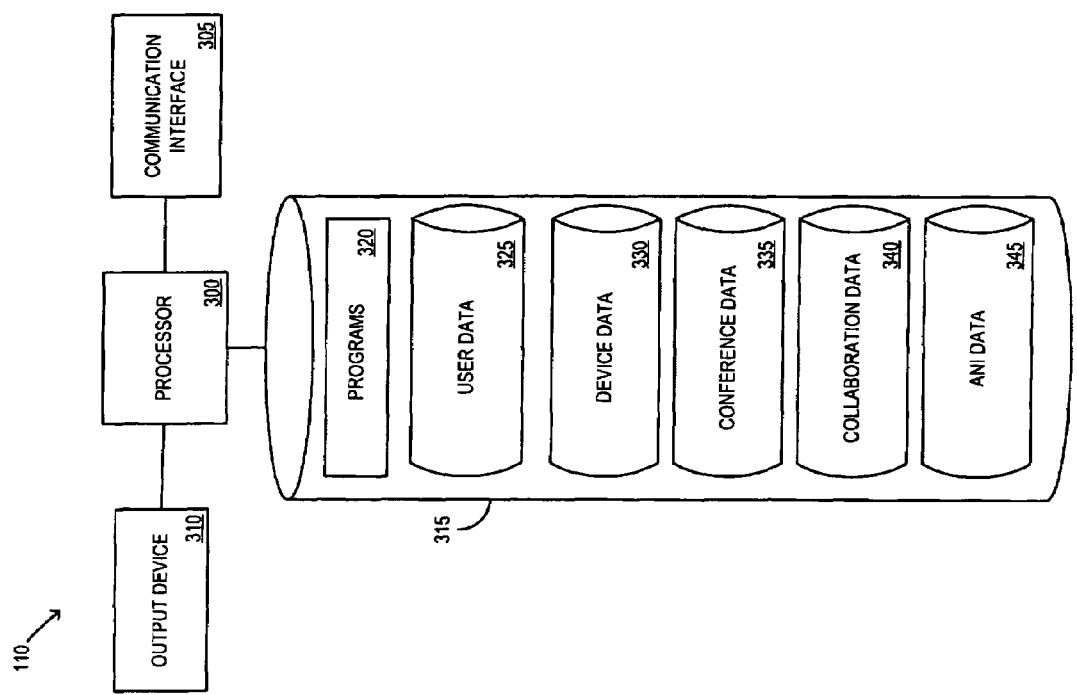
FIG. 3 is an exemplary diagram of a server of FIG. 1.

FIG. 3 is an exemplary block diagram illustrating server 110 in general hardware terms. Server 110 may include a processor 300. Processor 300 may include, for example, one or more conventional microprocessors. Server 110 may include a communication interface 305 coupled to processor 300 that allows processor 300 to send and receive data via LAN 105 and/or to exchange data with other components of telecommunication system 100. One or more output device(s) 310 may be coupled to processor 300. Output device(s) 310 may include, for example, one or more printers and/or display devices. It should be appreciated that server 110 may also include one or more, fewer, or alternative input devices, such as a keyboard, a computer mouse, etc. coupled to processor 300 to allow a user to provide input to server 110.

Server 110 may include a storage device 315. Storage device 315 may include one or more, or a combination of, magnetic, solid state and optical storage devices, such as one or more hard disk drives, as well as ROM (read only memory) and RAM (random access memory). Storage device(s) 315 may store programs 320. Programs 320 may include instructions to control processor 300 and/or telecommunication system 100 to perform all or at least some of the functions described herein.

Storage device(s) 315 may further store user data 325 that identifies users who have privileges to interact with telecommunication system 100. Usernames, passwords, levels of access, etc., may be stored as part of user data 325.

Storage device(s) 315 may also store device data 330 that identifies devices such as, for example, land-line telephones, cellular telephones, pagers, PDAs, computers, etc. by which messaging may be provided or communication channels may be opened for users listed in the user data 325. In some embodiments, device data 330 may be integrated with user data 325.

Storage device(s) 315 may also store conference data 335. Conference data 335 may include data concerning conference telephone calls that are currently taking place, including such information as the names of participants or users and identifying data (e.g., telephone numbers) for the devices being used by the participants for the telephone conference calls. In some instances, conference data 335 may include historical data concerning conference telephone calls that have previously occurred and/or pre-configuration data to facilitate rapid set-up of future conference telephone calls.

Storage device(s) 315 may also store collaboration data 340. Collaboration data 340 may include data concerning present or past multi-media collaboration sessions. Collaboration data 340 may include such information as, for example, names of the participants, the addresses of their computers, and the nature of the data being exchanged during a collaboration session. Collaboration data 340 may include pre-configuration data to facilitate rapid set-up of future multi-media collaboration sessions.

Collaboration data 340 may include such information as, for example, names of the participants, the addresses of their computers, and the nature of the data being exchanged during a collaboration session. Collaboration data 340 may include pre-configuration data to facilitate rapid set-up of future multi-media collaboration sessions.

Storage device(s) 315 may also store ANI (automatic number identification) data 345. ANI data 345 may include data concerning ANI information for a communication device (e.g., a cellular telephone, a landline telephone, or any other device that may have telephony functionality incorporated therein, such as, a PDA) associated with telecommunication system 100 and/or server 110. ANI data 345 may include a series of digits, either analog or digital, that are included in a call that identifies the telephone number associated with a communication device making the call. Furthermore, ANI data 345 may include a pointer, reference, or other indicia associating a user with the communication devices identified as being associated with the ANIs stored in ANI data 345. Thus, a mechanism is provided for identifying a user (i.e., caller) that is associated with a communication device identified by the ANI and associated with telecommunication system 100 and/or server 110.

It is noted that a user may have one or more communication devices connected to, or at least associated, with telecommunication system 100 and/or server 110. A user may, for instance, own/use a cellular telephone and a landline telephone associated with telecommunication system 100. Further, telecommunication system 100 may be aware of the presence and/or activity of a communication device (e.g., cellular phone 175, landline phone 160, SIP telephone 195, or computer 120) by virtue of, for example, functionality provided by server 110 or the like. For example, communication broker 205 may provide presence monitoring as mentioned hereinabove. Thus, telecommunication system 100 may be aware of a telephone call participated in by a communication device associated therewith. Part of the presence monitoring may be to detect, determine, or otherwise obtain the status and activity of communication devices associated with telecommunication system 100, including for example, the phone number of a communication device(s) connected to the telecommunication system 100 associated communication device in a telephone call.

Thus, telecommunication system 100 may be aware of the presence and activity of a first communication device associated therewith and communicating with a second one (or more) communication device(s) via a telephone call. Telecommunication system 100 may have knowledge of the users associated (e.g., registered) with the telecommunication system and the communication devices of the users associated with the telecommunication system. Thus, when the first communication device places a call to telecommunication system 100, telecommunication system 100 (e.g., via functionality provided by server 110) may extract ANI information of the first communication device from the incoming call and determine that the first communication device is associated with telecommunication system 100 by referencing ANI data 345. ANI data 345 may include a pointer, reference, or other indicia to associate the telecommunication system 100 registered user with the extracted ANI information. Having determined the ANI-to-user information (e.g., using ANI data 345) and having a knowledge of the activity of an associated user, telecommunication system 100 may ascertain the phone number of the second one (or more) communication devices previously engaged in a telephone call with the first communication device. Telecommunication system 100 may use the phone number of the second one (or more) communication devices previously engaged in a telephone call with the first communication device to implement a number of functions, including reconnecting the first communication device to the second one (or more) communication devices.

Storage device 315 may store other data and programs which are not explicitly indicated in FIG. 3, including data and programs in accordance with the OpenScape® software application, available from the assignee hereof.

Figure 4:
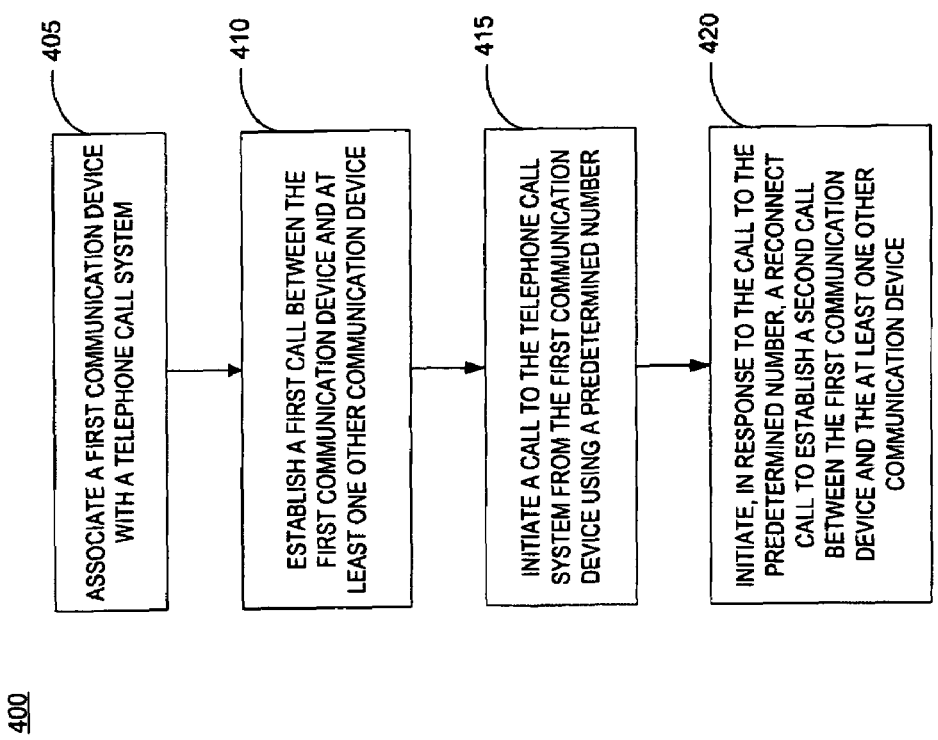
FIG. 4 is an exemplary flow diagram illustrating a process, in accordance with some embodiments hereof.

FIG. 4 is a flow diagram that illustrates a process that may be performed by telecommunication system 100 to allow a user to reconnect a telephone call to a communication device associated with telecommunication system 100, according to some embodiments herein.

At an initial operation 405, a user may associate or register a first communication device with telecommunication system 100. It is noted that the user may associate one or more communication devices with telecommunication system 100. The communication device may be any one of a number of devices having telephony functions incorporated, integrated, or associated therewith such as, for example, a landline phone 165, a SIP phone 195, and a cellular phone 175, or a PDA (not shown). Associating a communication device with telecommunication system 100 may encompass, for example, indicating which of a number of communication devices associated with the user of telecommunication system 100 is a "preferred" device. As used herein, a preferred device may be a communication device designated as a preferred communication device for contacting the user. For example, in the instance a communication (e.g., email message, voice message, instant message, etc.) is directed to the user of telecommunication system 100, the communication will be routed to the preferred communication device of the user. The designation of the preferred device may by determined by the user, telecommunication system 100, or a combination of the user and system depending on, for example, a status of the user, and/or a number of applicable rules governing contacting the user. The rules may be modified to suit a user's preferences or may be dictated according to system defaults.

It should be appreciated by those in the art that operation 405 may not be performed each and every time other aspects of process 400 (or other embodiments herein) are executed since, a user or telecommunication system 100 need not associate a communication device with telecommunication system 100 at every invocation of process 400. That is, process 400 may rely on a previous association of the first communication device with telecommunication system 100. As with other aspects of process 400, no implied temporal relationships are intended by the order or interconnecting arrows in FIG. 4.

At operation 410, a first call is established between the first communication device and at least one other communication device. For example, a registered user of telecommunication system 100 is called or initiates a call to at least one other communication device. In the instance the first call is a conference call, the first communication device may be connected to two or more communication devices. According to the operational capabilities of telecommunication system 100, the presence and activity of the first communication device and the first call is monitored by the telecommunication system. The telecommunication system 100 monitors and keeps a record of the communication connections for the first communication device.

At operation 415, a call is initiated to telecommunication system 100 from the first communication device using a predetermined number. The predetermined number may be referred to, in some instances, as a pilot number. The pilot number may be associated with certain functions and/or features of telecommunication system 100. In particular, a call to the pilot number may invoke a reconnect process by telecommunication system 100 that reconnects the communication device calling into telecommunication system 100 using the predetermined pilot number to a previous call. That is, the reconnect process may reconnect the first communication device to the at least one other communication device that was connected thereto during the first call.

In some embodiments herein, a function or feature invoked by a call to the predetermined pilot number may be invoked automatically upon receipt of the call by telecommunication system 100. That is, the user may not have to perform any action(s) in order to solicit the desired function or feature associated with the pilot number other than initiating a call to telecommunication system 100 using the predetermined pilot number. In this manner, the need for a user to remember a personal identification number (PIN) and/or password may be obviated.

At operation 420, in response to the call to the predetermined number, telecommunication system 100 may initiate a reconnect call to establish a second call between the first communication device and the at least one other communication device. The reconnect may be automatically invoked upon telecommunication system 100 receiving a call via the predetermined pilot number.

In some embodiments, the first call between the first communication device and the at least one other communication device (e.g., established at 410) is terminated prior to the first communication device initiating the call to telecommunication system 100 (e.g., operation 415).

Furthermore, the reconnect call may be facilitated by telecommunication system 100 extracting ANI information of the first communication device using information received with the receipt of the call to the predetermined pilot number from the first communication device. The ANI information may be used to identify the user of the first communication device by referencing a data store (e.g., database, lookup table, listing, etc.) of the users of telecommunication system 100 and ANIs associated with the users.

In some embodiments hereof, the call to telecommunication system 100 is terminated prior to a charged being incurred and charged to the calling party, the first communication device. Telecommunication system 100 may extract the ANI information and terminate the call before the call is answered since ANI information is transmitted in the telephone call signals prior to an actual voice connection being established (e.g., typically by the second ring of a call). In this manner, a user may avoid charges (e.g., toll, roaming, and long distance) when accessing the reconnect features disclosed herein. This aspect may provide savings, especially in the instance the first communication device is a cellular telephone operating outside of the cellular telephone's home cellular network.

In some embodiments herein, the predetermined pilot number may be stored in a memory associated with a memory associated with the first communication device. For example, the predetermined pilot number may be stored locally in a memory resident in a cellular telephone. The predetermined number may also be stored in a removable memory connected to the communication device such as, for example, a SIM (Subscriber Identity Module) card. Thus, the predetermined pilot number need not be remembered by a user and can be made portable for easy transport between multiple communication devices.

In some embodiments herein, the reconnect number is invoked to reconnect the first call between the first communication device and the at least one other communication device (e.g., operation 420). However, telecommunication system 100 may be configured such that a reconnect call may selectively reconnect the first communication device to any number of prior calls, not only a most recent call (e.g., the first call). This aspect of the present invention may be implemented by telecommunication system 100 selectively providing a user the option of connecting to, for example, any one of the last three communication devices or calls connected to the first communication device.

In some embodiments herein, features and functions additional to or in lieu of a reconnect call may be invoked by calling the predetermined pilot number from the first communication device. Other such features may include other telephony features and functions associated with telecommunication system 100, such as, for example, changing a designation of a user's preferred device.

In the instance the first call is a conference call, telecommunication system 100 may further include the operation of determining whether the conference call is still in progress prior to initiating a reconnect call to reconnect the first communication device to the conference call, in response to the first communication device calling the predetermined pilot number.

It should be appreciated that process of FIG. 4 may result in a sequence of attempts to reconnect an interrupted call, e.g., a dropped cellular telephone call. In some embodiments, the number of attempts to reconnect may selectively determined to be three or four attempts. There may be a waiting period between each attempt.

It should be understood that an "automatic" initiation of a reconnect need not necessarily be made immediately. Indeed, in practice, it may be desirable to delay an automatic call for a period of time.

The system described herein has various kinds of multimedia collaboration capabilities in addition to the above-described telephone call management functions. However, the reconnect feature disclosed herein may be included in a telephone system that lacks some, most, or all other collaboration features. Such a system may also lack presence and other features described above.

Although a telecommunication system has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A method of automatically reconnecting a telephone call participant to one or more other participants to the call, the method comprising:
    associating a first communication device with a telecommunication system, said first communication device being associated with a first telecommunication system user;
    establishing in said telecommunication system a first telephone call between said first communication device and at least one other communication device associated with another telecommunication system user;
    initiating a call to an advanced services module in the telecommunication system from the first communication device responsive to disconnect of said first call, said call to the advanced services module using a predetermined number other than a number to the at least one other communication device of the first telephone call; and
    automatically initiating, in response to the call to the advanced services module a reconnect call by the advanced services module to establish a second call between the first communication device and the at least one other communication device.

2. A method according to claim 1, wherein the at least one other communication device is at least two other communication devices associated with two other telecommunication system users in a collaboration module.

3. A method according to claim 2, further comprising the advanced services module being aware that the first communication device was previously connected to the at least two communication devices during the first telephone call.

4. A method according to claim 2, wherein the first call and the reconnect call are conference calls created and maintained by said collaboration module.

5. A method according to claim 2, further comprising the advanced services module determining whether the at least two other communication devices are still engaged in the first call prior to initiating the reconnect call.

6. A method according to claim 1, wherein the first telephone call between the first communication device and the at least one other communication device is terminated prior to the initiating of the call to the advanced services module.

7. A method according to claim 1, further comprising extracting ANI (Automatic Number Identification) information of the first communication device that initiated the call to the advanced services module, a basic services module extracting said ANI information.

8. A method according to claim 7, further comprising the basic services module identifying a user associated with the first communication device based on the extracted ANI information.

9. A method according to claim 8, wherein the identifying comprises the basic services module referencing a data store of users of the telecommunication system and ANIs associated with the users, communications destinations being chosen responsive to user presence information from said data store and the presence each communication device associated with telecommunication system.

10. A method according to claim 1, wherein the call initiated by the first communication device to the advanced services module telephone system using the predetermined number is terminated prior to a charge being incurred for the call.

11. A method according to claim 1, wherein the first communication device is a cellular telephone.

12. A method according to claim 1, further comprising the advanced services module being aware that the first communication device was previously connected to the at least one other communication device during the first telephone call.

13. A method according to claim 1, wherein the first telephone call was a most recent telephone call participated in by the first communication device, prior to the initiation of the call to the advanced services module.

14. A method according to claim 1, wherein the predetermined number is retrieved from a memory connected to the first communication device.

15. A method according to claim 1, wherein the advanced services module choosing communications destinations responsive to user presence information and the presence each communication device associated with telecommunication system.

16. A method according to claim 1, further comprising the advanced services module invoking, in response to the call to the predetermined number, at least one telephony function other than the reconnect call.

17. A system for interactive telecommunication comprising:
    a processor running a collaboration system, said collaboration system comprising:
        a collaboration unit, collaboration sessions being created, modified and deleted by interactive telecommunication system clients through said collaboration unit, an interaction center interfacing subscriber and guest telephony services to interactive telecommunication system subscribers and guests, a mobility module providing message services to interactive telecommunication system subscribers, and a communication broker module providing telecommunication system services and automation in said interactive telecommunication system; and a memory coupled to the processor and storing instructions to cause the collaboration system to:

associate a first communication device with said interactive telecommunication system;

establish in said interactive telecommunication system by said communication broker module a first telephone call between said first communication device and at least one other communication device;

initiating a call to the interactive telecommunication system from the first communication device responsive to disconnect of said first call, said call to the interactive telecommunication system using a predetermined number other than a number to the at least one other communication device of the first telephone call; and automatically initiating by said communication broker module, in response to the call to the predetermined number, a reconnect call by the interactive telecommunication system to establish a second call between the first communication device and the at least one other communication device.

18. A system according to claim 17, wherein the processor and the memory comprises a telecommunication server.

19. A system according to claim 17, further comprising storing instructions to cause the communication broker module to extract ANI (Automatic Number Identification) information of the communication device that initiated the call to the interactive telecommunication system using the predetermined number.

20. A system according to claim 19, further comprising storing instructions to cause the communication broker module to identify a user associated with the communication device based on the extracted AM information.

21. A system according to claim 20, further comprising a data store of users of the interactive telecommunication system and ANIs associated with the users, the communication broker module choosing communications destinations responsive to user presence information from said data store and the presence of each communication device associated with the interactive telecommunication system.

22. A system according to claim 17, further comprising a user interface that facilitates a user associated with the telecommunication system an option of designating, at least, a user preference regarding establishing the reconnect call by the telecommunication system, wherein once associated, said telecommunication system retains the association after call completion and the communication broker module may re-establish calls from said first communication device to other communication devices and reconnect based on said association.

23. A system according to claim 17, wherein the at least one other communication device is at least two other communication devices.

24. A system according to claim 17, further comprising the communication broker module invoking, in response to the call to the predetermined number, at least one telephony function other than the reconnect call.

25. An interactive telecommunication system comprising:

a processor running a collaboration system, said collaboration system comprising:

a plurality of collaboration modules creating, modifying and deleting collaboration sessions with clients, interfacing subscriber and guest telephony services to subscribers and guests, and providing message services to subscribers, and a communication broker module including a basic services module providing phone support, PBX interfaces, call features and management, an advanced services module including a multipoint control unit (MCU), an automation module, and a toolkit module; and a memory coupled to the processor and storing instructions to cause the collaboration system to:

associate a first communication device with said interactive telecommunication system;

establish in said interactive telecommunication system by said communication broker module a first telephone call between said first communication device and at least one other communication device;

initiating a call to the interactive telecommunication system from the first communication device responsive to disconnect of said first call, said call to the interactive telecommunication system using a predetermined number other than a number to the at least one other communication device of the first telephone call; and automatically initiating by said communication broker module, in response to the call to the predetermined number, a reconnect call by the interactive telecommunication system to establish a second call between the first communication device and the at least one other communication device.

* * * * *